United States Patent
Shin

(10) Patent No.: US 10,830,414 B2
(45) Date of Patent: Nov. 10, 2020

(54) LENS COVER AND LED LIGHTING DEVICE HAVING LENSES ARRANGED AT POSITIONS CORRESPONDING TO LED LIGHT SOURCES

(71) Applicant: AMOSENSE CO., LTD., Cheonan-si (KR)

(72) Inventor: Gyu Weon Shin, Daejeon (KR)

(73) Assignee: AMOSENSE CO., LTD., Cheonan-si (KR)

( * ) Notice: Subject to any disclaimer, the term of this patent is extended or adjusted under 35 U.S.C. 154(b) by 0 days.

(21) Appl. No.: 16/622,260

(22) PCT Filed: Jun. 7, 2018

(86) PCT No.: PCT/KR2018/006481
§ 371 (c)(1),
(2) Date: Dec. 12, 2019

(87) PCT Pub. No.: WO2018/230881
PCT Pub. Date: Dec. 20, 2018

(65) Prior Publication Data
US 2020/0103092 A1    Apr. 2, 2020

(30) Foreign Application Priority Data

Jun. 13, 2017 (KR) .................. 10-2017-0073969

(51) Int. Cl.
*F21V 5/04* (2006.01)
*F21S 8/08* (2006.01)
*F21W 111/02* (2006.01)

(52) U.S. Cl.
CPC .............. *F21V 5/045* (2013.01); *F21S 8/088* (2013.01); *F21W 2111/02* (2013.01)

(58) Field of Classification Search
CPC .. F21S 8/085; F21V 5/004; F21V 5/04; F21V 5/007; F21Y 2115/10
See application file for complete search history.

(56) References Cited

U.S. PATENT DOCUMENTS

| 6,773,139 B2 * | 8/2004 | Sommers ................ F21V 5/006 |
| | | 257/E25.02 |
| 8,632,225 B2 | 1/2014 | Koo et al. |

(Continued)

FOREIGN PATENT DOCUMENTS

| CN | 203036555 U | 7/2013 |
| CN | 203963816 U | 11/2014 |

(Continued)

OTHER PUBLICATIONS

KR Notification of Reason for Refusal dated Jun. 28, 2019 as received in Application No. 10-2017-0073969.

(Continued)

*Primary Examiner* — Robert J May
(74) *Attorney, Agent, or Firm* — Maschoff Brennan

(57) ABSTRACT

The present disclosure proposes a lens cover and an LED lighting device including the same, which may minimize occurrence of a dark portion even while expanding a light distribution area of an LED light source. The proposed lens cover includes a plurality of first light distribution lenses and a second light distribution lenses having different shapes from each other, and the first light distribution lens and the second light distribution lens are mixedly arranged at positions corresponding to the plurality of LED light sources.

11 Claims, 10 Drawing Sheets

(56) References Cited

U.S. PATENT DOCUMENTS

2012/0307504 A1* 12/2012 Chou ................. F21V 5/007
                                                    362/351
2014/0168975 A1   6/2014 Ng et al.

FOREIGN PATENT DOCUMENTS

| | | |
|---|---|---|
| CN | 204879957 U | 12/2015 |
| JP | 2004-199891 A | 7/2004 |
| JP | 2014-120477 A | 6/2014 |
| KR | 10-0890270 B1 | 3/2009 |
| KR | 10-2012-0019000 A | 3/2012 |
| KR | 10-1708377 B1 | 2/2017 |

OTHER PUBLICATIONS

CN Office Action in Application No. 201880038188.5 dated Apr. 23, 2020.

\* cited by examiner

LENS COVER AND LED LIGHTING DEVICE HAVING LENSES ARRANGED AT POSITIONS CORRESPONDING TO LED LIGHT SOURCES

TECHNICAL FIELD

The present disclosure relates to an LED lighting device mounted with a plurality of LED light sources.

BACKGROUND ART

In general, various types of lighting devices may be installed in a road or a tunnel. As a conventional lighting device, a sodium lamp, a halogen lamp, a mercury lamp or a metal halide lamp have been used. However, these lamps consume a lot of electricity, have a short usage life, have a high maintenance cost, and have an environmental pollution problem.

Accordingly, efforts to apply a light emitting diode (LED) light source have been continued to solve the problem of power consumption according to the use of the lamp described above and to extend the lamp replacement cycle according to the extension of the lamp life.

The lighting device using the LED as a light source disposes a light distribution lens at a position corresponding to a light source unit, and uses by diffusing or collecting the light of the LED light source as necessary. As described above, if the light source is composed of a plurality of LED elements, a plurality of light distribution lenses may be arranged at positions corresponding to the respective LED elements. At this time, the plurality of light distribution lenses may be equally configured to have any one shape of oval or circular. For example, if the light distribution lens is applied to the oval lenses as illustrated in FIG. 1, the light distribution area projected by the oval lens is oval shape and its projection distance is short. Alternatively, if the light distribution lens is applied to the circular lenses as illustrated in FIG. 2, the light distribution area projected by the circular lens is formed in a circular shape, and its projection distance is formed longer than that of the oval light distribution lens. However, there is a problem in that the circular light distribution lens has a large brightness difference between the center and the periphery of the light distribution area.

As described above, if only any one of the oval lens and the circular lens is used as the light distribution lens in the LED lighting device, the light distribution areas of adjacent lighting devices may overlap each other to increase the brightness, but dark portions (I, II) may be formed or distribution of lighting intensity may also be uneven. The formation of such a dark portion or non-uniformity of the lighting intensity may cause the driver to be optical illusion and fatigue, which may act as a serious factor that may cause a traffic accident.

Further, a road lighting device such as a general street lamp is installed at a height of about 12 m or more, there is a hassle to necessarily use a separate maintenance vehicle at the time of maintenance work of the lighting device.

DISCLOSURE

Technical Problem

An object of the present disclosure is to provide a lens cover and an LED lighting device including the same, which may minimize occurrence of a dark portion even while extending the light distribution area of an LED light source.

Further, another object of the present disclosure is to provide a lens cover and an LED lighting device including the same, which may sufficiently comply with the recommendations of the Road Traffic Act, such as an average brightness, an uniformity ratio of illumination, and an unified glare rating even if the installation height of the lighting device is implemented to a low height of less than 3 m.

Technical Solution

For achieving the objects, a lens cover according to an embodiment of the present disclosure is the lens cover having a plurality of light distribution lenses arranged at positions corresponding to a plurality of LED light sources, and the plurality of light distribution lenses include a first light distribution lens and a second light distribution lens having different shapes from each other, and the first light distribution lens and the second light distribution lens are mixedly arranged at positions corresponding to the plurality of LED light sources.

For achieving the objects, an LED lighting device according to an embodiment of the present disclosure includes a post, a head connected to one end of the post, and a lens cover coupled to the head, and the lens cover has a plurality of light distribution lenses arranged at positions corresponding to a plurality of LED light sources, the plurality of light distribution lenses include a first light distribution lens and a second light distribution lens having different shapes from each other, and the first light distribution lens and the second light distribution lens are mixedly arranged at positions corresponding to the plurality of LED light sources.

Advantageous Effects

According to an embodiment of the present disclosure, it is possible to provide the lighting device, which satisfies the recommendations of the Road Traffic Act, such as an average brightness, a uniformity ratio of illumination, and a unified glare rating even if the lighting device of a relatively low height is installed on the roadside.

MODE FOR INVENTION

Figure 1:
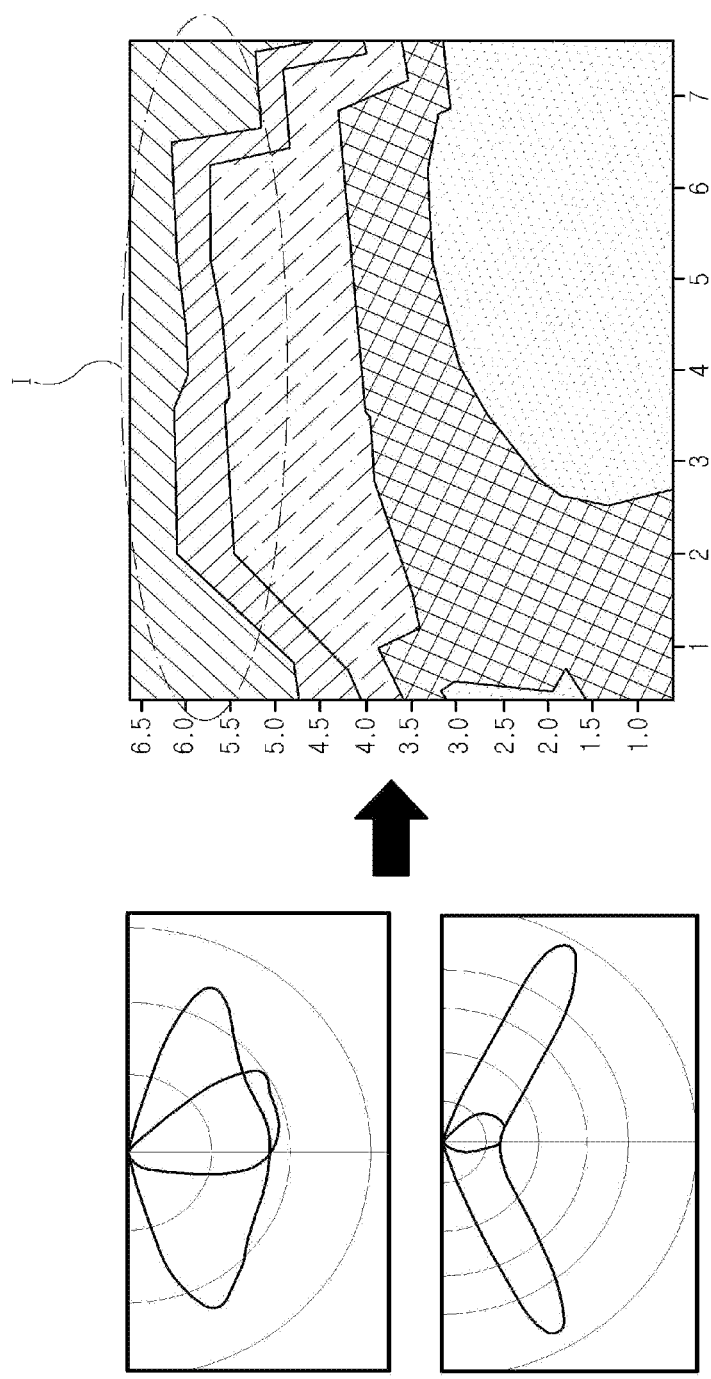
FIG. 1 is a diagram schematically illustrating a light distribution diagram in a state where an oval lens is applied to a general LED lighting device.
Figure 2:
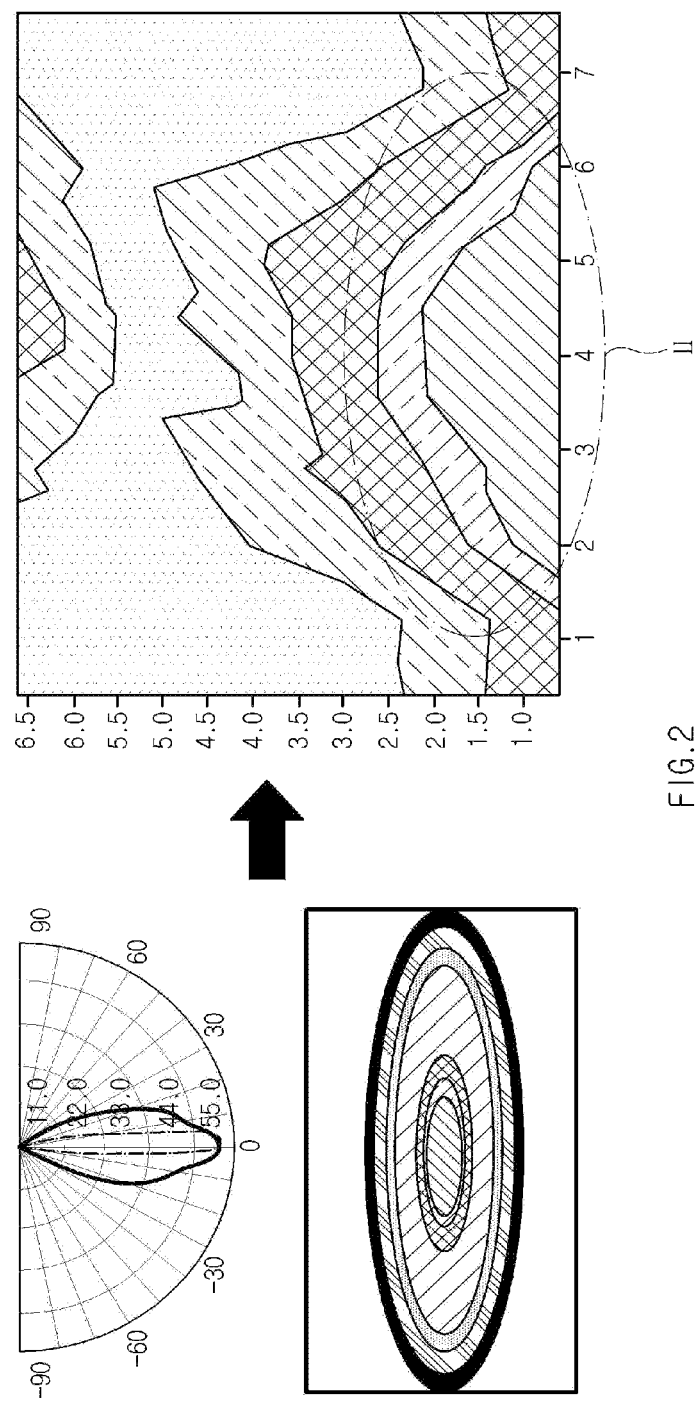
FIG. 2 is a diagram schematically illustrating a light distribution diagram in a state where a circular lens is applied to a general LED lighting device.

Hereinafter, the present disclosure will be described with reference to the accompanying drawings. However, the present disclosure may be implemented in various forms, and accordingly, is not limited to the embodiment described herein. Further, a portion irrelevant to the description has been omitted in the drawings for clearly describing the present disclosure, and like portions has been denoted by like reference numerals throughout the specification.

Figure 3:
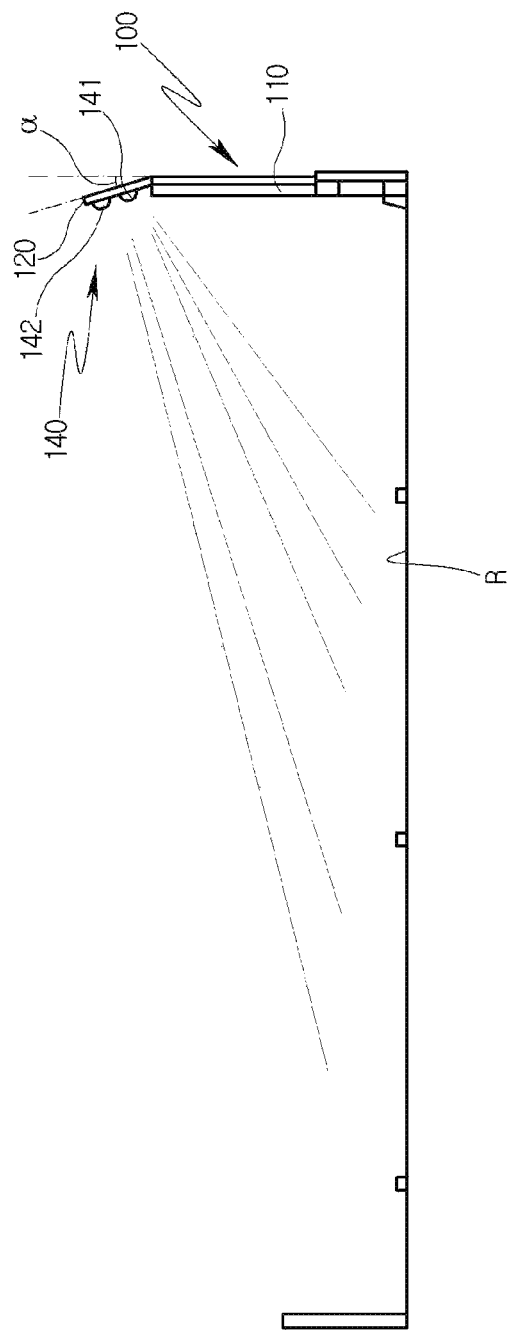
FIG. 3 is a diagram schematically illustrating an LED lighting device according to an embodiment of the present disclosure.

Referring to FIG. 3, an LED street lamp 100 according to an embodiment of the present disclosure includes a post 110, a head 120, and a cover 140.

The post 110 is fixedly installed on the installation surface (ground) of the roadside along the longitudinal direction of the road, and has a predetermined height. In an embodiment, the post 110 may be formed at a low height of 3 m or less. For example, if an LED lighting device according to an embodiment is installed adjacent to a bridge, the length of the post 110 may be formed to be 3 m or less, thereby minimizing interference with the bridge work of the maintenance vehicle. Further, it is possible to reduce the length of the post compared to the conventional, thereby reducing the manufacturing cost of each lighting device.

The head 120 is connected to the upper portion of the post 110 to have a predetermined inclination in one side direction. The head 120 may be provided with a heat dissipation member (not illustrated) so that at least one LED (see FIG. 5) is operated within a range of a proper temperature.

The cover 140 is coupled to one side of the head 120, and the cover 140 may secure a light distribution area of a setting range. A printed circuit board on which a plurality of LEDs are mounted is accommodated inside the cover 140, that is, between the cover 140 and the head 120. Assuming a two-lane road, the cover 140 may be formed at an angle (α) of 10° or more and 15° or less with respect to the axis extending from the post 110.

Figure 4:
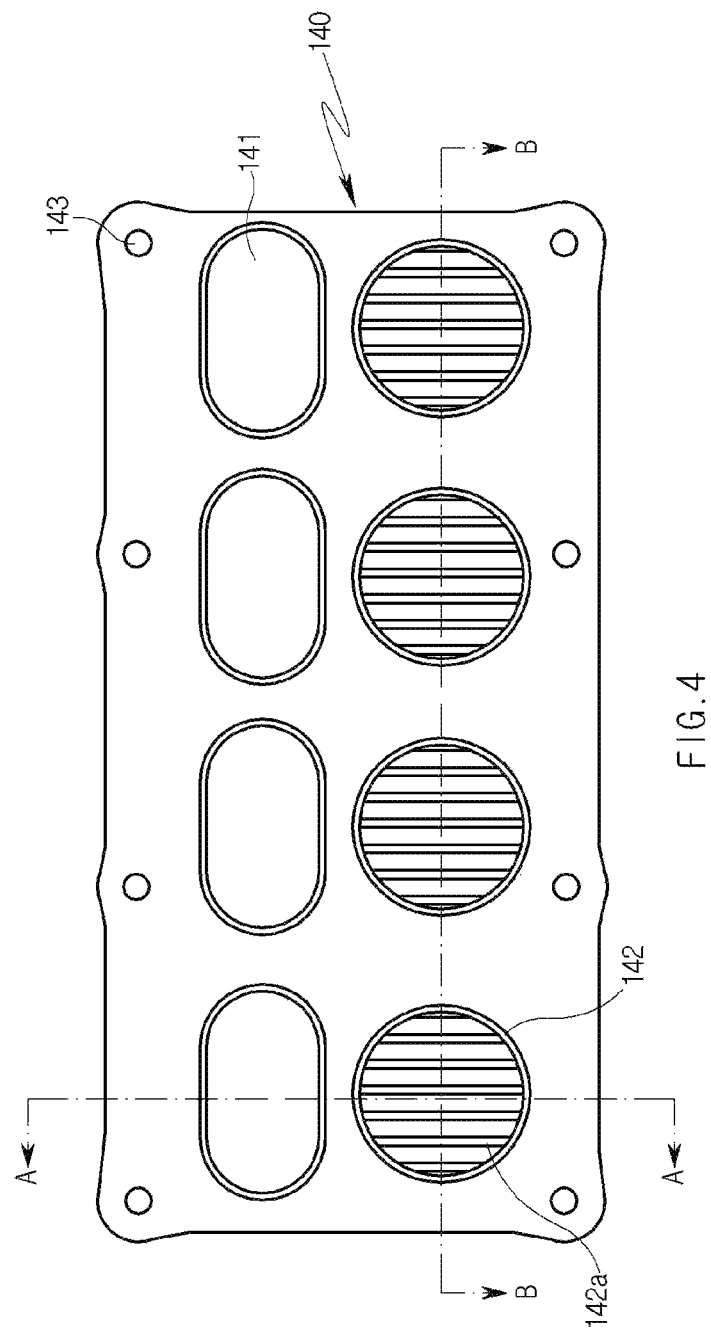
FIG. 4 is a plane diagram illustrating a cover for an LED lighting device according to an embodiment of the present disclosure.
Figure 5:
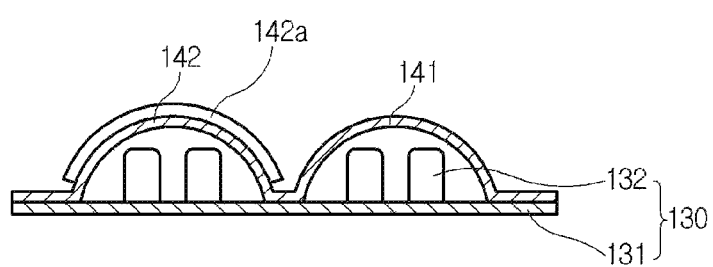
FIG. 5 is a cross-sectional diagram taken along the line "A-A" of FIG. 4.
Figure 6:
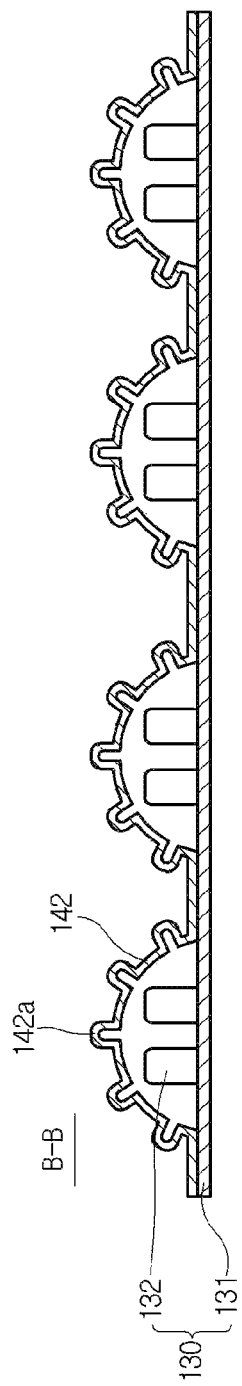
FIG. 6 is a cross-sectional diagram taken along the line "B-B" of FIG. 3.

Referring to FIGS. 4 to 6, the LED lighting device 100 according to an embodiment includes an LED module 130 and the cover 140.

The LED module 130 is coupled so that light is distributed to one side of the head 120, for example, the roadside. The LED module 130 is manufactured in the form of a module in which a plurality of LEDs 132 are mounted on a printed circuit board 131. The number of the LEDs 132 used in the LED module 130 may be determined according to the length, the intensity of illumination, or the like of the set post 110.

The cover 140 has a lens matrix composed of a plurality of lenses. In other words, the cover 140 includes a first light distribution lens 141 and a second light distribution lens 142 having different shapes from each other, and the first light distribution lens 141 and the second light distribution lens 142 are mixedly arranged with each other.

The first light distribution lens 141 irradiates light at a relatively short distance from the lighting device with respect to the lighting device, and the second light distribution lens 142 irradiates light at a farther distance than the first light distribution lens 141. The first light distribution lens 141 is formed to have an oval hemispherical shape (hemispherical shape with different diameters of X and Y axes from each other when viewed in plane), and the second light distribution lens 142 is formed to have a hemispherical shape.

At this time, at least one uneven portion 142a is provided on the surface of the second light distribution lens 142. The uneven portion 142a is formed in the same direction as the axial direction of the post 110. The uneven portion 142a increases the surface area of the second light distribution lens 142 and induces scattered reflection of light generated from the LED 132, thereby increasing the light distribution area of the light projected from the second light distribution lens 142. Accordingly, the light distribution range of the light may be more extended along the longitudinal direction of the road.

Figure 9:
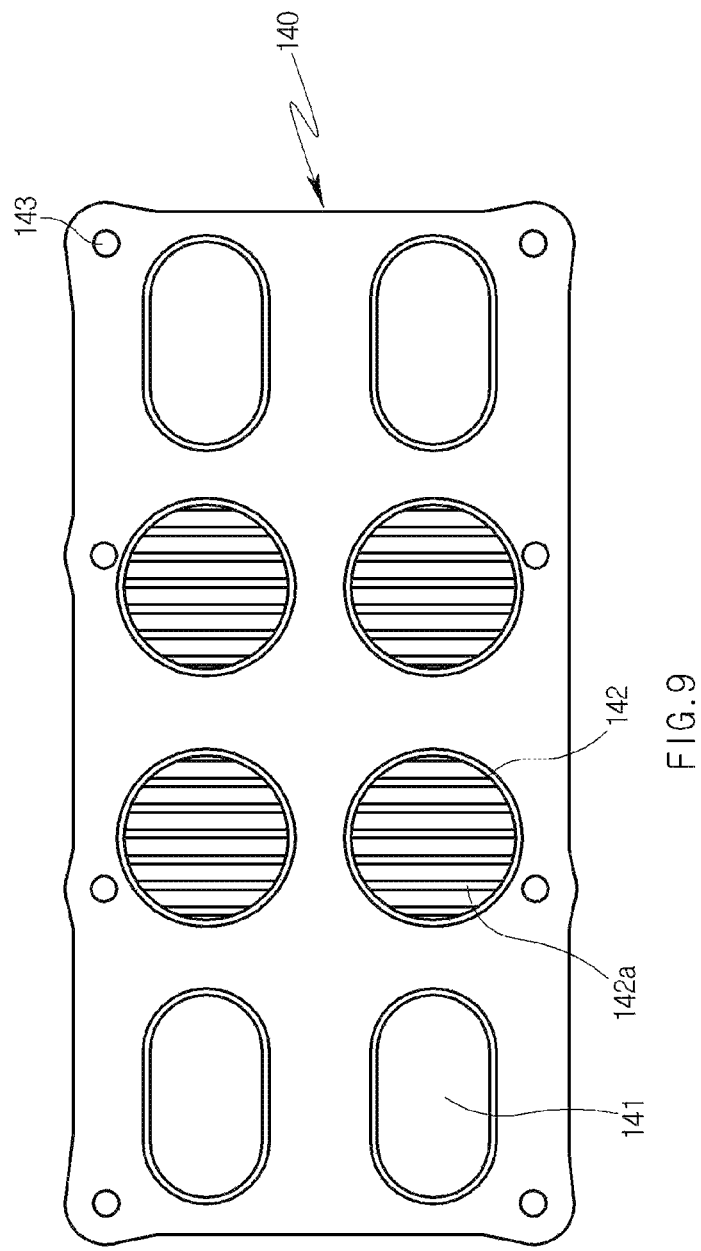
FIG. 9 is a front diagram illustrating a cover for an LED module according to another embodiment of the present disclosure.
Figure 10:
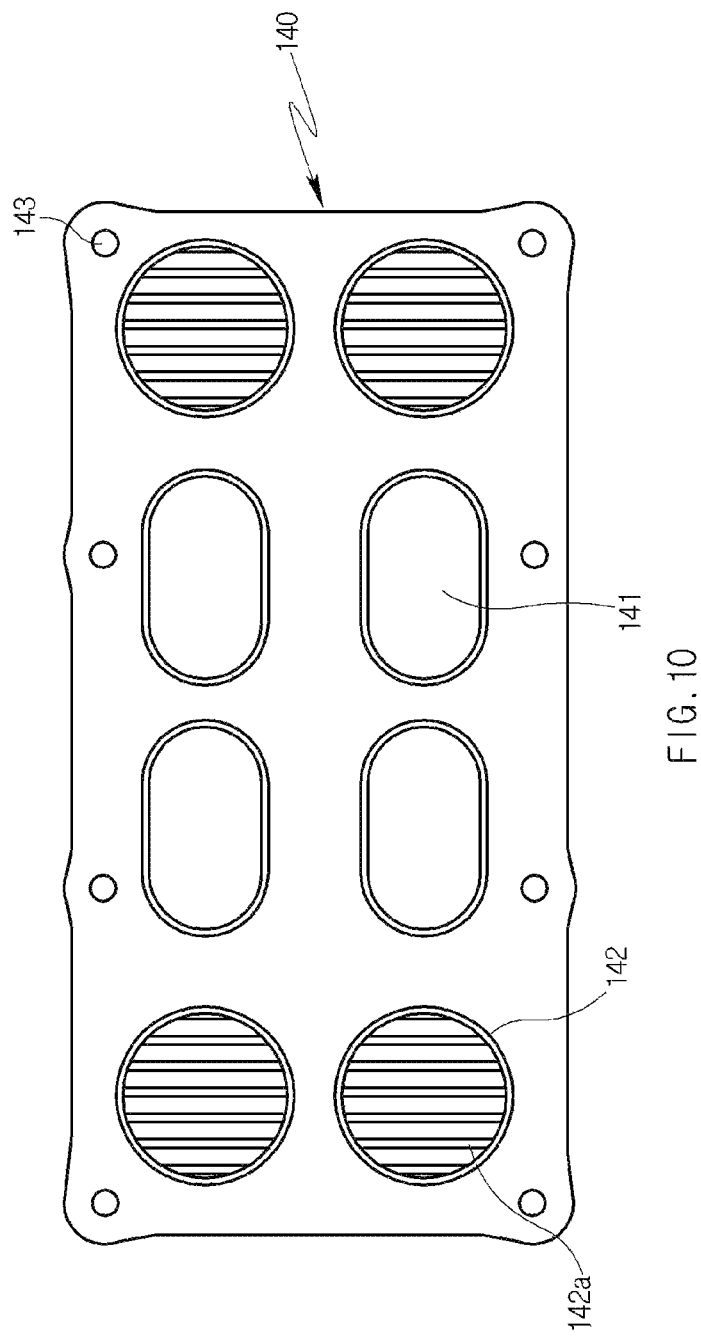
FIG. 10 is a front diagram illustrating a cover for an LED module according to still another embodiment of the present disclosure.

Referring to FIG. 4, the cover 140 of an embodiment has a lens matrix arranged in two rows, a plurality of first light distribution lenses 141 are arranged in a first row, and a plurality of second light distribution lenses 142 are arranged in a second row. However, the lens matrix is not necessarily limited thereto. For example, as in FIG. 9, the first light distribution lenses 141 may be arranged at the outermost of both sides of the first row and the second row of the cover 140 and the second light distribution lenses 142 may be arranged between the first light distribution lenses, or as in FIG. 10, the second light distribution lenses 142 may be arranged at the outermost of both sides of the first row and the second row of the cover 140 and the first light distribution lenses 141 may also be arranged between the second light distribution lenses. Further, in an embodiment, the lens is arranged to have a matrix of 4*2, but the matrix of the lens may be increased or decreased as necessary.

Meanwhile, a plurality of fastening holes 143 are formed at the periphery of the cover 140 for fastening with the head 120, and the cover 140 may be coupled to the head 120 by using a fixing member such as a screw penetrating the fastening hole 143.

Figure 7:
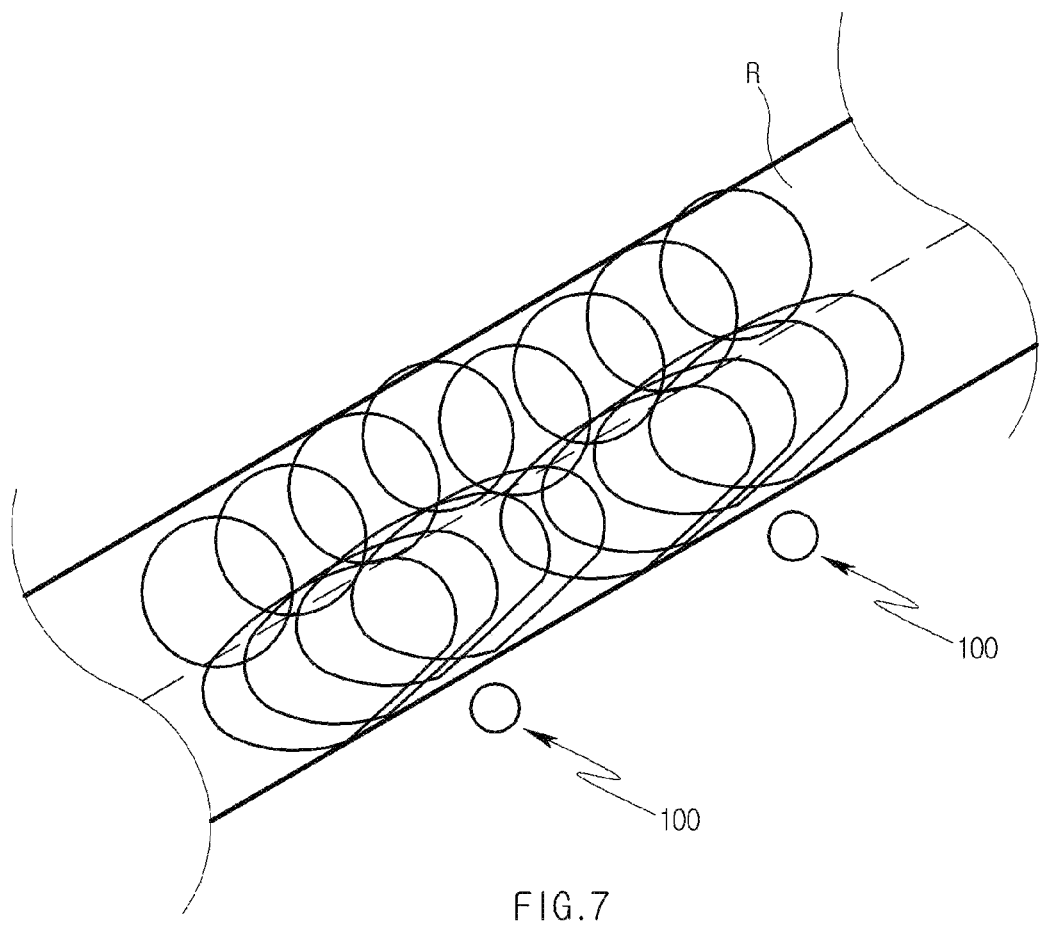
FIG. 7 is a diagram schematically illustrating a light distribution area projected on the lane from an LED lighting device according to an embodiment of the present disclosure.
Figure 8:
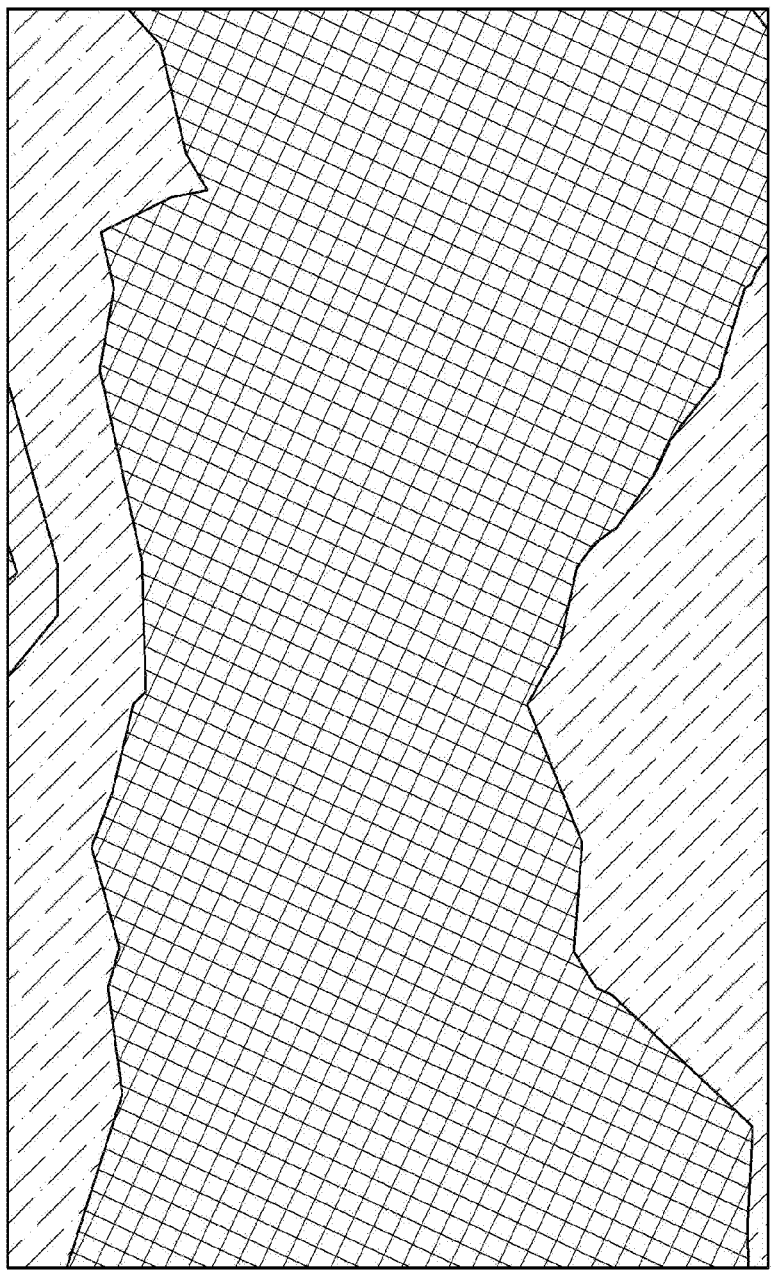
FIG. 8 is a diagram illustrating a light distribution diagram of a case of applying an LED lighting device according to an embodiment of the present disclosure.

FIGS. 7 and 8 illustrate a light distribution diagram after light has been projected on the lane in a state where an LED lighting device according to an embodiment of the present disclosure has been installed on the roadside. At this time, the height of the lighting device was 2.1 m, the installation distance between the lighting devices was 8 m, the width of the road was 7.2 m (based on two lanes), the inclination angle of the cover was 10 degrees, the ambient temperature was 10° C., and the illuminance of the LED was 60001 m.

Accordingly, the light distribution area projected from the lighting device is formed so that a plurality of substantially oval short-distance light distribution areas are overlapped with each other on the lane of a position close to the lighting device by the first light distribution lenses 141, and a plurality of substantially circular long-distance light distribution areas are overlapped with each other on the lane of a position farther than the above by the second light distribution lenses 142. Further, the short-distance light distribution area by the first light distribution lenses 141 and the long-distance light distribution area by the second light distribution lenses 142 are also overlapped with each other.

Accordingly, it is possible to implement the uniform brightness distribution in both short and long distances with respect to the lighting device, and to minimize occurrence of the dark portion on the lane.

Meanwhile, Table 1 below represents the results if the LED lighting device was installed according to the installation environment as described above.

TABLE 1

| Items | Results |
| --- | --- |
| Average brightness | 3.1 |
| Overall uniformity ratio of illumination | 0.45 |
| Uniformity ratio of illumination of lane axis | 0.7 |
| Unified glare rating | 11% |

According to the Road Traffic Act, it is recommended that uniformity ratio of illumination of an artificial lighting is ⅓ and the unified glare rating is within 15%. Here, the brightness represents the amount of light reflected from the target surface, and the uniformity ratio of illumination, as the degree of uniformity of illumination of the illuminance intensity distribution, represents a ratio of a high illuminance portion and a low illuminance portion. Accordingly, it may be seen that even if the lighting device of a relatively low height of 2.1 m is applied as in an embodiment, the average brightness, the uniformity ratio of illumination, and the unified glare rating all satisfy the recommendations.

The foregoing description of the present disclosure is intended for illustration, and it will be understood by those skilled in the art to which the present disclosure pertains that the present disclosure may be easily modified in other specific forms without changing the technical spirit or essential feature of the present disclosure.

The invention claimed is:

1. A lens cover having a plurality of light distribution lenses arranged at positions corresponding to a plurality of LED light sources,
   wherein the plurality of light distribution lenses comprise a first light distribution lens and a second light distribution lens having different shapes from each other, and
   wherein the first light distribution lens and the second light distribution lens are mixedly arranged at positions corresponding to the plurality of LED light sources,
   wherein the first light distribution lens is an oval hemispherical shape, and the second light distribution lens is a hemispherical shape,
   wherein the lens cover is coupled to a head of a lighting device,
   wherein one or more uneven portions are formed on a surface of the second light distribution lens, and
   wherein the one or more uneven portions are formed in a same direction as an axial direction of a post to which the head is connected.

2. The lens cover of claim 1, wherein the lens cover is arranged at an angle of 10° or more and 15° or less with respect to the axis extending from the post of the lighting device.

3. The lens cover of claim 1, wherein a plurality of first light distribution lenses are arranged on the outermost of both sides of the lens cover, and a plurality of second light distribution lenses are arranged between the plurality of first light distribution lenses.

4. The lens cover of claim 1, wherein a plurality of second light distribution lenses are arranged on the outermost of both sides of the lens cover, and a plurality of first light distribution lenses are arranged between the plurality of second light distribution lenses.

5. An LED lighting device, comprising:
   a post;
   a head connected to one end of the post; and
   a lens cover coupled to the head,
   wherein the lens cover has a plurality of light distribution lenses arranged at positions corresponding to a plurality of LED light sources,
   wherein the plurality of light distribution lenses comprises a first light distribution lens and a second light distribution lens having different shapes from each other, and
   wherein the first light distribution lens and the second light distribution lens are mixedly arranged at positions corresponding to the plurality of LED light sources,
   wherein the lens cover is arranged at an angle of 10° or more and 15° or less with respect to the axis extending from the post of the lighting device.

6. The LED lighting device of claim 5,
   wherein the post has the length of 3 m or less.

7. The LED lighting device of claim 5, wherein the first light distribution lens is an oval hemispherical shape, and the second light distribution lens is a hemispherical shape.

8. The LED lighting device of claim 7, wherein one or more uneven portions are formed on a surface of the second light distribution lens.

9. The LED lighting device of claim 8, wherein the one or more uneven portions are formed in a same direction as an axial direction of a post to which the head is connected.

10. The LED lighting device of claim 7, wherein a plurality of first light distribution lenses are arranged on the outermost of both sides of the lens cover, and a plurality of second light distribution lenses are arranged between the plurality of first light distribution lenses.

11. The LED lighting device of claim 7, wherein a plurality of second light distribution lenses are arranged on the outermost of both sides of the lens cover, and a plurality of first light distribution lenses are arranged between the plurality of second light distribution lenses.

* * * * *